Figure 1:
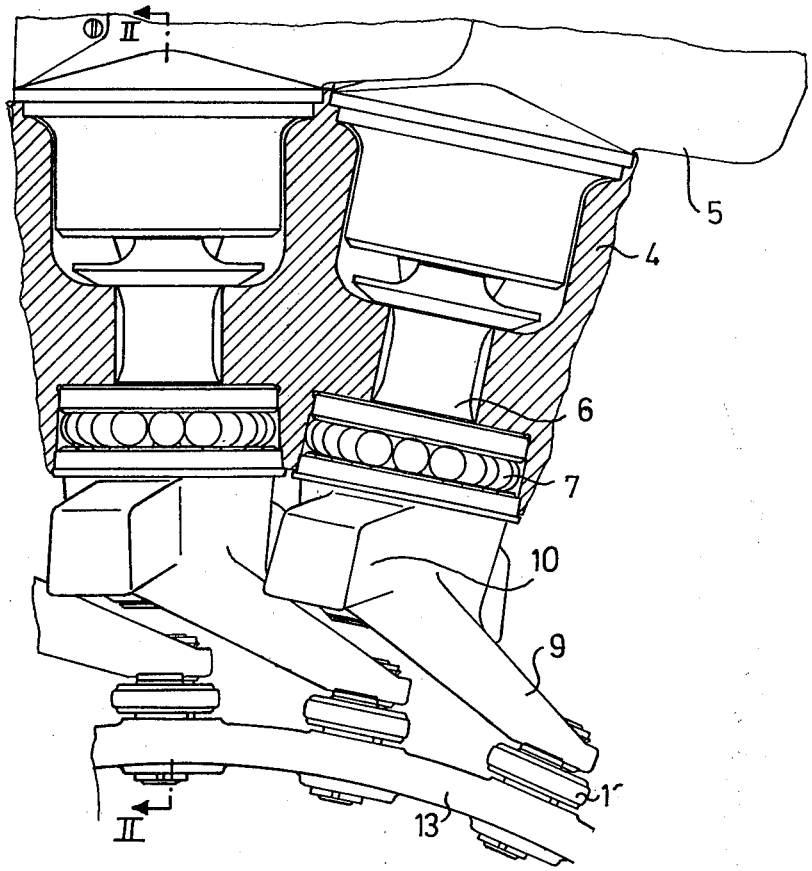

United States Patent [19]
Bredsted

[11] 3,920,353
[45] Nov. 18, 1975

[54] IMPELLER WHEEL FOR AN AXIAL FLOW FAN WITH ADJUSTABLE VANES

[75] Inventor: Ole Jacobsen Bredsted, Naestved, Denmark

[73] Assignee: Nordisk Ventilator Co., A/S, Naestved, Denmark

[22] Filed: Jan. 23, 1974

[21] Appl. No.: 436,015

[30] Foreign Application Priority Data
Jan. 23, 1973  Denmark ............................. 366/73

[52] U.S. Cl. ............................................. 416/168
[51] Int. Cl.$^2$ ......................................... F04D 29/36
[58] Field of Search ........................... 416/163–168

[56] References Cited
UNITED STATES PATENTS

| | | | |
|---|---|---|---|
| 2,660,461 | 11/1953 | Corby ............................ | 416/168 X |
| 2,844,303 | 7/1958 | Kristiansen ........................ | 416/164 |
| 3,085,631 | 4/1963 | Dagrell ............................. | 416/168 |

FOREIGN PATENTS OR APPLICATIONS

| | | | |
|---|---|---|---|
| 1,197,030 | 7/1970 | United Kingdom ............. | 416/168 A |
| 424,678 | 5/1967 | Switzerland ..................... | 416/168 A |

*Primary Examiner*—Everette A. Powell, Jr.
*Attorney, Agent, or Firm*—Sughrue, Rothwell, Mion, Zinn & Macpeak

[57] ABSTRACT

An impeller wheel for an axial flow fan with adjustable vanes. Each vane comprises a pin which is rotatably accommodated in the hub rim of the wheel and within the said rim carries an adjustment arm which via a link rod is connected to an adjustment member which is common to all the vanes and is displaceable in the axial direction of the wheel, but is coupled to the wheel for rotation together with the latter. At one end the link rod is connected to the adjustment arm by means of a radial bearing and at its other end is connected to the adjustment member likewise by means of a radial bearing. At least one of these bearings consists of two parts, one of which has a sliding surface in the form of a hemispherical belt or a semi ball belt which slides in the other part which has the form of a cup with a corresponding sliding surface. In connection with one of these bearing parts a member is provided to prevent the parts from falling apart during standstill periods of the fan, and the link arm possesses a mass of such an order of magnitude that the centrifugal force on the arm occurring during the operation of the wheel is sufficient for keeping the two parts pressed against each other even when the highest possible adjustment force is being applied.

4 Claims, 3 Drawing Figures

3,920,353

IMPELLER WHEEL FOR AN AXIAL FLOW FAN WITH ADJUSTABLE VANES

The invention relates to an impeller wheel for an axial flow fan with adjustable vanes, where each vane comprises a pin which is rotatably accommodated in the hub rim of the wheel and within the said rim carries an adjustment arm which via a link rod is connected to an adjustment member which is common to all the vanes and is displaceable in the axial direction of the wheel, but is coupled to the wheel for rotation together with the latter, and where at one end the link rod is connected to the adjustment arm by means of a radial bearing and at its other end is connected to the adjustment member, likewise by means of a radial bearing.

It applies in particular to large impeller wheels that the adjustment forces are of a very considerable order of magnitude, and these are the forces acting radially on the said bearings which consequently must be very sturdy. However, inside the impeller wheel the space at disposal is only very slight, and the bearings must therefore be made as small as possible.

The invention offers a particularly expedient solution to these conflicting problems by at any rate one of these bearings consisting of two parts, one of which has a sliding surface in the form of a hemispherical belt sliding in the other part which has the form of a cup with a corresponding sliding surface, and by a member being provided in connection with one of these parts for preventing the parts from falling apart, and by the link rod possessing a mass of such an order of magnitude that the centrifugal force produced on the arm during the operation of the wheel is sufficient for keeping the two parts pressed against each other even when the highest possible adjustment force is being applied.

The said bearing consisting of two parts is known per se, but only as one half of a radial bearing consisting of two such halves which when mounted are assembled so as to face each other.

It will be obvious that in a bearing consisting only of the two parts, the first part will on the application of a radial force be pressed out of the second part. In the known radial bearing this is avoided by the two halves facing each other. When a radial force tends to make the hemispherical part slide out of the hemispherical cup in one of the halves, the other half will then provide the necessary axial reaction to prevent this sliding out.

Since according to the invention only one half is used, a considerable economy in space is achieved, but at the same time the advantage over the known radial bearing referred to is achieved that the bearing is completely free of play even after wear, and for the present purpose this is of particularly great importance since due to the fact that there is no play it is possible to achieve an adjustment of the vanes free of hysteresis.

The said member intended to prevent the parts from falling apart may be very slight dimensioned since it need not force the parts tightly together, but is only intended for keeping them in place relative to each other during the periods when the wheel is at rest and no centrifugal force occurs.

If a movement of adjustment is performed during the standstill period of the wheel, the adjustment force amounts to only a fraction of the force necessary for performing the adjustment when the wheel is rotating at its normal speed, and when the wheel is being started the centrifugal force will increase more rapidly than the adjustment force, so that the centrifugal force will quickly take over providing the axial force necessary for pressing the parts together.

It is most expedient that both bearings of the link rod are designed as stated by the invention, but this is not absolutely necessary since, particularly at the connection to the adjustment member where the requirements as to economy of space are at least, some other form of bearing may be used if this should be desirable.

When both bearings are designed as stated by the invention, the mass centre of the link rod should be located halfway between the two bearings so that the centrifugal force is distributed evenly.

Figure 2:
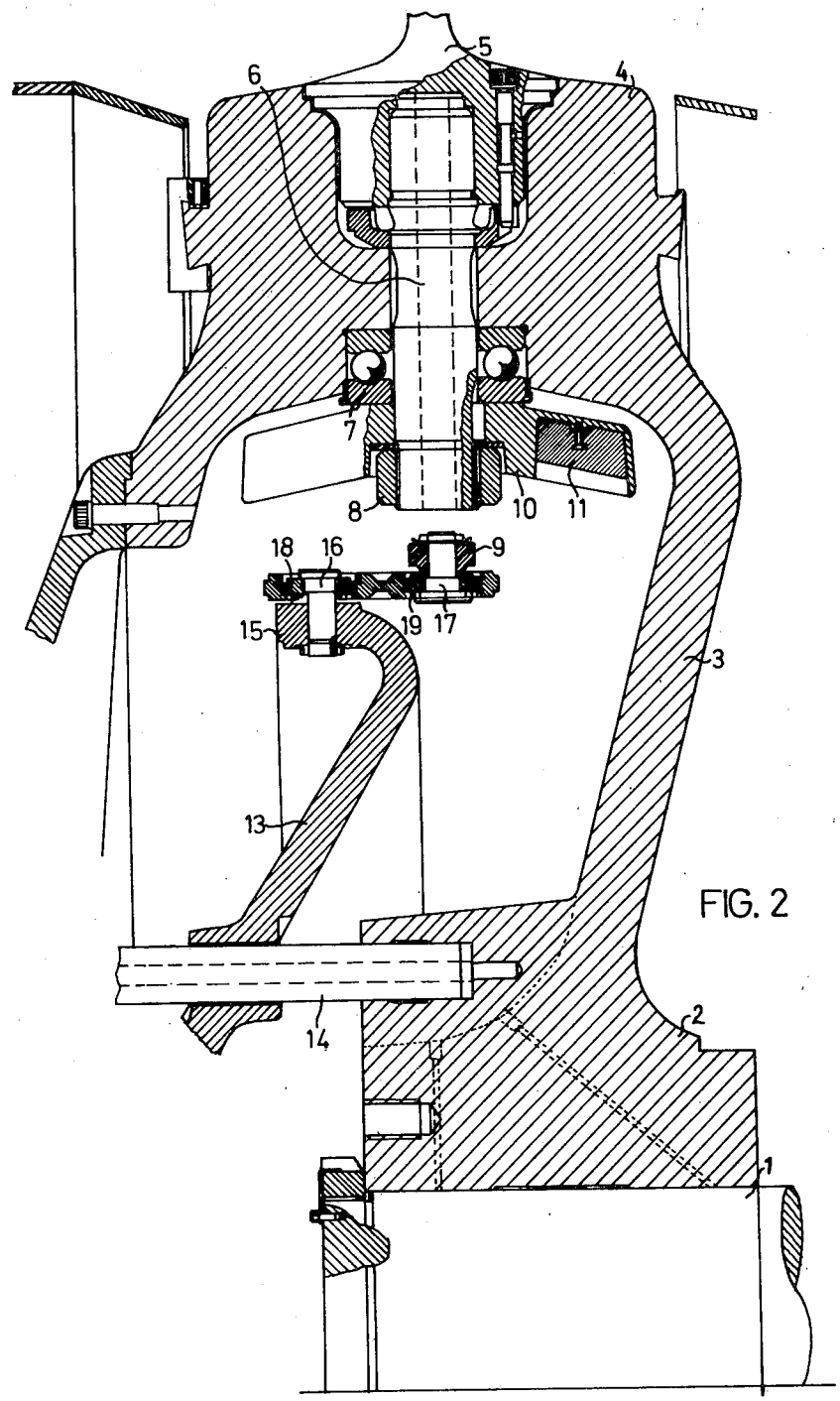
Figure 3:
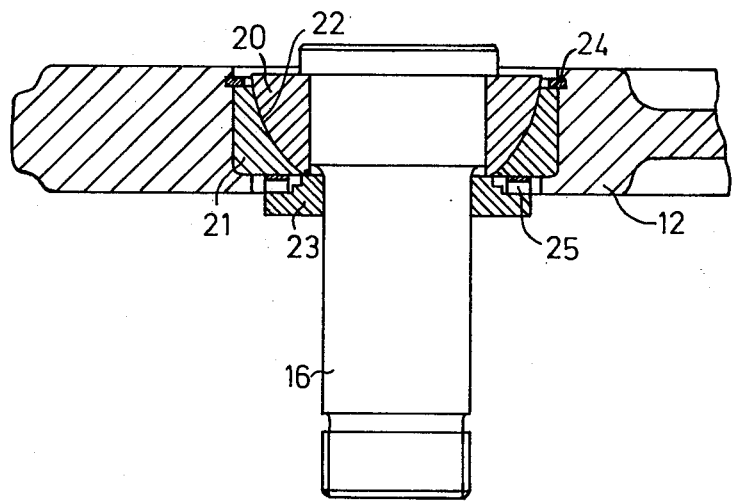

Below, the invention is explained in greater detail with reference to the drawing in which FIG. 1 shows part of an embodiment of an impeller wheel according to the invention, FIG. 2 shows a section on line II—II in FIG. 1 and FIG. 3 shows a detail of what is shown in FIG. 2 on a larger scale.

On the shaft 1 of the wheel its hub 2 is secured. The hub is in this embodiment constructed so as to be integral with a hub disc 3 and a hub rim 4. In the hub rim a number of vanes 5 have been journalled each with a pin 6 in an axial bearing 7 secured by means of a nut 8 which at the same time clamps an intermediate portion on the pin 6 with an adjustment arm 9 and two balancing wings 10 which in their extreme ends are filled with lead 11 to achieve the necessary balancing. Each adjustment arm 9 is by means of a link rod 12 connected to an adjustment disc 13 which is axially displaceable relative to the wheel, but rotates together with the latter by means of drivers, of which FIG. 1 shows a single driver 14.

By an axial displacement of the adjustment disc 13 an adjustment of the total number of vanes will occur, but the means with which this displacement is brought about are not shown in the drawing, as they are of no relevance to the invention and may be designed in any suitable way.

In the embodiment shown, the link rod 12 is at its two ends connected rotatably to the flange 15 of the adjustment disc 13 and to the adjustment arm 9, respectively, by means of pins 16 and 17 and bearings 18 and 19. Of these, the bearing 18 is shown more clearly and more detailed in FIG. 3 which shows that the bearing consists of two parts 20 and 21, the part 20 comprising a sliding surface 22 of the form of a hemispherical belt or semi ball belt, while the part 21 is shaped as a cup with a corresponding sliding surface.

The two parts 20 and 21 may e.g. in a manner known per se consist of steel where on one sliding surface a wear-resisting glass-fibre-reinforced nylon coating is provided.

The pin 16 is formed as a fitting bolt and serves for clamping the bearing part 20 to the flange 15, a spacer ring 23 being placed between the two components.

The bearing part 21 is fitted into a reamed bore in the link rod 12 and secured by means of a resilient locking ring 24.

The diameter of the spacer ring 23 at the side facing the bearing is sufficiently small for letting it go clear of the bearing part 21, but on the remaining part the spacer ring has a larger diameter, and between this part and the bearing part 21 a spring is inserted, e.g. as indicated in the form of a corrugated washer 25, the spring tension of which is sufficient for, during standstill, keeping the arm 12 in its place with the two bearing parts 21 and 22 in contact with each other, even if an adjustment of the vanes is performed during the standstill. The radial forces occurring during this operation are comparatively small so that only a relatively weak spring is required to prevent the two parts 20 and 21 from being forced away from each other.

The arm 12 possesses such a mass that the centrifugal force occurring on this arm during the operation of the wheel is sufficient to prevent the two bearing parts 21 and 22 from being pressed away from each other even when subjected to the strongest radial forces occurring.

The bearing 19 need not be described in details since it is designed and secured in a way corresponding exactly to that shown for the bearing 18 in FIG. 3.

When FIG. 3 is regarded it will be obvious that a play-free contact between the two bearing parts 21 and 22 due to the centrifugal force during the operation of the wheel will be maintained even if wear occurs, so that a retightening of the bearings after they have been used for some time will not at all be called for.

It will moreover be apparent that in principle the corrugated washer 25 could be omitted, but this would give rise to an unpleasant clattering noise when during start the bearing parts are by the increasing tangential force made to engage each other and, in addition, there might be some risk of damage occurring to the surfaces of the bearings.

What is claimed is:

1. An impeller wheel for an axial flow fan with adjustable vanes, where each vane has a pin which is rotatably accommodated in the hub rim of the fan wheel and within the said rim has an adjustment arm and an adjustment member for adjusting the pitch of the vanes which is common to all the vanes and is displaceable in the axial direction of the fan wheel, but is coupled to the wheel for rotation together with the latter; the improvements comprising:
   a. a link rod connecting each adjustment arm with the adjustment member such that axial movement of said adjustment member changes the pitch of the adjustable vanes; and
   b. two piece hemispherical bearing means interposed between said link rod and said adjustment member, and between said link rod and said adjustment arm oriented such that the centrifugal force generated by rotation of the impeller wheel acting on the link rod retains the bearing pieces in contact with each other even when the highest possible adjustment force is being applied.

2. The impeller wheel of claim 1 wherein the bearing means comprises:
   a. a first hemispherical bearing attached to said adjustment member;
   b. a first bearing attached to a first end of said link rod, said first bearing having a hemispherical cavity therein, the surface of said hemispherical cavity slidingly engaging the surface of said first hemispherical bearing;
   c. a second hemispherical bearing attached to said adjustment arm; and
   d. a second bearing attached to a second end of said link rod, said second bearing having a hemispherical cavity therein, the surface of said hemispherical cavity slidingly engaging the surface of said second hemispherical bearing.

3. The impeller wheel of claim 2 wherein spring means are interposed between said adjustment member and said first bearing, and between said adjustment arm and said second bearing so as to maintain engagement between said first bearing and said first hemispherical bearing, and between said second bearing and said second hemispherical bearing when said impeller wheel is stationary.

4. The impeller wheel of claim 2 wherein the hemispherical surface of the first and second hemispherical bearings face radially inwardly.

* * * * *